Aug. 19, 1941.  H. E. MUCHNIC  2,253,042
TRUCK SUSPENSION MEANS
Filed March 30, 1940  2 Sheets-Sheet 1
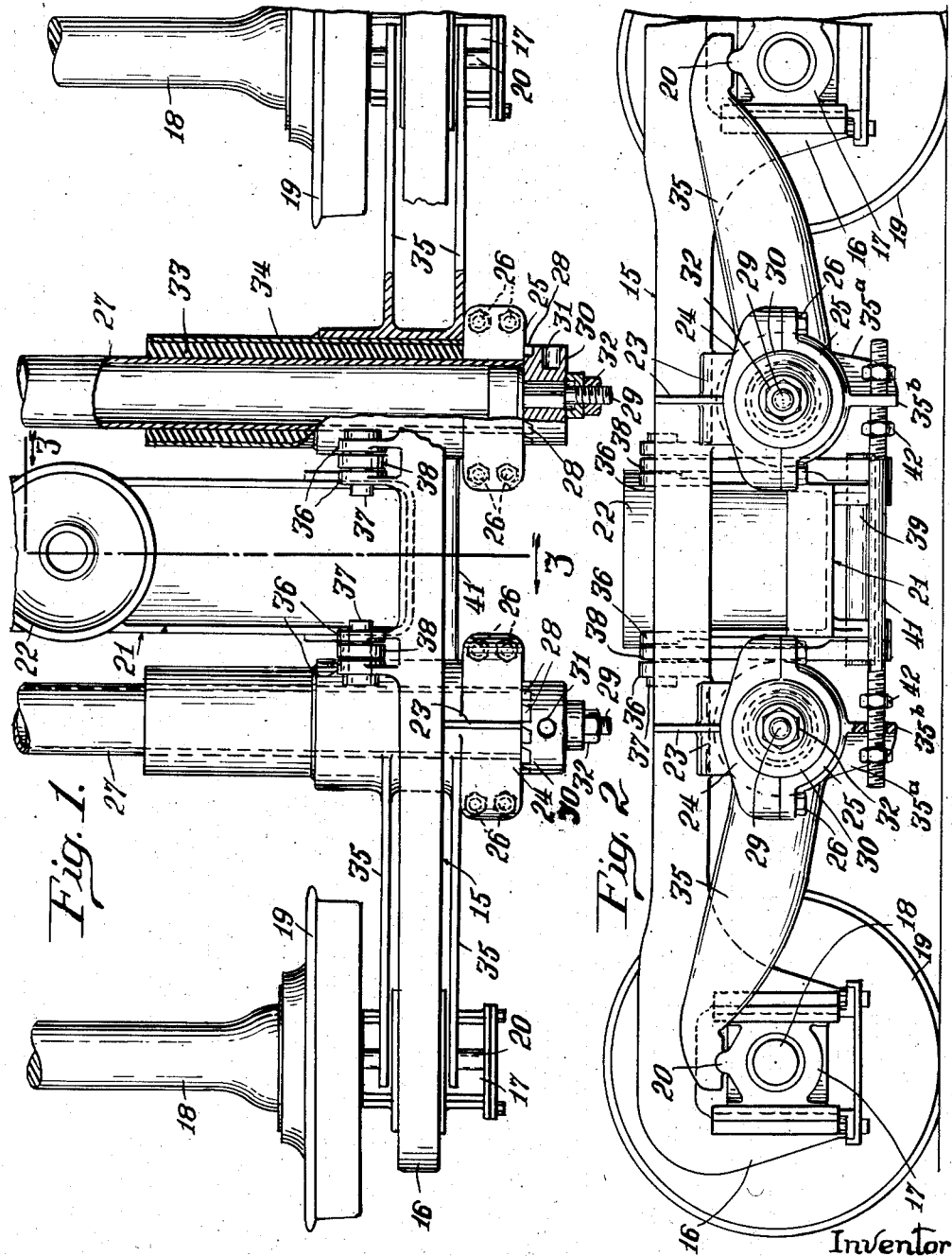
Inventor
Henry E. Muchnic
By George Heidner
Attorney.

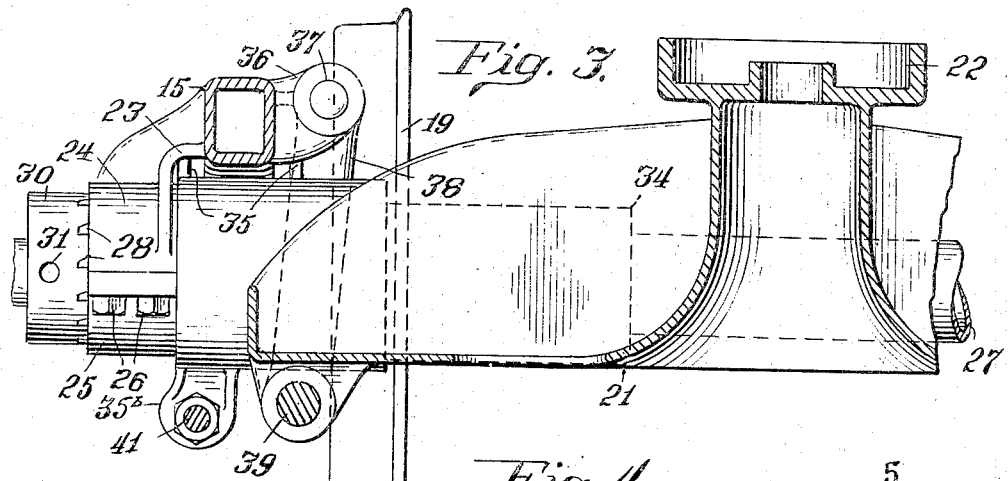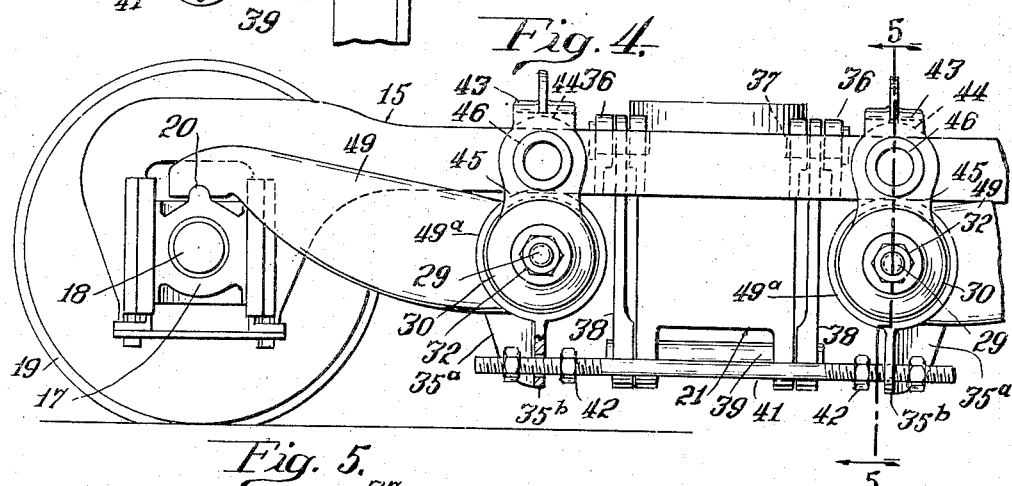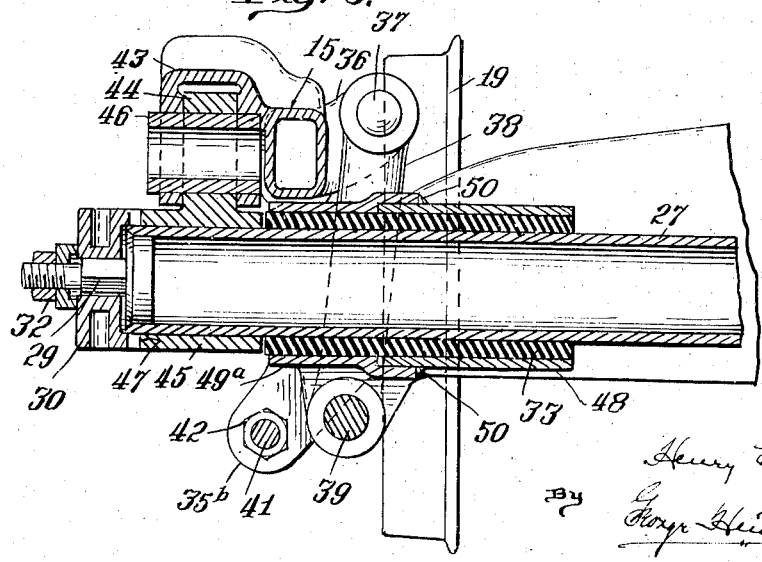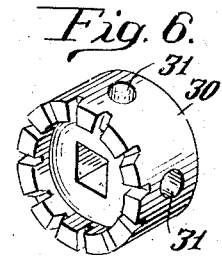

Patented Aug. 19, 1941

2,253,042

UNITED STATES PATENT OFFICE 2,253,042

TRUCK SUSPENSION MEANS

Henry E. Muchnic, Atchison, Kans., assignor to The Locomotive Finished Material Company, Atchison, Kans., a corporation of Kansas Application March 30, 1940, Serial No. 326,826

6 Claims. (Cl. 105—182)

My invention relates to suspension means more especially intended for the trucks of railroad cars and has for its object the provision of mechanism for absorbing the movements of the wheels and axles and preventing the transmission of the jars or jolts, encountered by the wheels, to the truck frame and hence to the car body.

The invention contemplates a structure involving resilient cushioning elements, such as rubber, which will absorb the shocks and eliminate the noise of the wheels; whereby a unit suspension concentrated, as it were, at one point is provided and the usual multiple spring suspension for the bolster and for the journal boxes is eliminated and an easier riding car provided.

The invention also involves means whereby the degree of cushioning action or extent of deflection may be regulated and the extent of relative movement between the axles and the truck frame may be controlled.

The objects and advantages of my invention will all be readily comprehended from the detailed description of the accompanying drawings wherein:

Figure 1 is a plan view of one side of a railroad car truck with my suspension means applied; a portion of the latter being shown in section.

Figure 2 is a side elevation of the truck shown in Figure 1.

Figure 3 is a transverse sectional view taken substantially on the line 3—3 of Figure 1 as viewed by the arrows.

Figure 4 is a side elevation of a portion of a truck illustrating a modified form of the invention.

Figure 5 is a vertical sectional view taken on the line 5—5 of Figure 4 looking in the direction of the arrows.

Figure 6 is a detail perspective view of the tension regulating member employed in both exemplifications of the invention.

In the exemplifications of the invention my improved suspension means has been applied to a pedestal type of truck frame; the side frame 15 at its end being provided with integral pedestals 16 in which the usual journal-boxes 17 are slidably mounted, which, in this instance, receive the ends of the journals 18 disposed through the wheels 19; the tops of the journal-boxes 17 being preferably provided with an upstanding boss 20, see Figure 2. It will be understood, of course, that the side frame at the opposite side of the truck and associated elements heretofore described are of similar construction and that the elements now to be described are duplicated on the other side of the truck.

The side frame 15 at a distance removed from the pedestals 16, and on opposite sides of the bolster 21 and its center bearing 22, is provided with a pair of depending brackets 23, 23 preferably formed integral therewith.

The lower end of each bracket 23 terminates in a semi-hub portion 24 and a cap portion 25 removably secured to the semi-hub portion 24 by suitable bolts as at 26; the hub 24, 25 rotatably supporting the end of a cross member or rod 27. The outer face of the hub 24, 25 is provided with a plurality of circumferentially arranged teeth 28.

The cross member 27 in the exemplification is in the nature of a tubular rod whose ends are each provided with a stud 29 rigidly secured therein and extending outwardly beyond the hub portion of the bracket 23 and of square or non-circular cross-section; while the immediate outer end is shown reduced and screw-threaded, see Figure 1. The non-circular portion of the stud is provided with a toothed thimble or ratchet wheel 30 provided with a square or non-circular opening and preferably with bar or tool receiving holes 31, see Figure 6; the teeth of the ratchet wheel 30 meshing with the circumferentially arranged teeth 28 of the hub 24, 25, and the meshing condition being maintained by suitable nuts 32 which screw onto the threaded end of the stud 29 and hence maintain the adjusted relation between the cross member or rod 27 and the bracket 23.

The cross member 27 is provided with a resilient sleeve or rubber cushion element 33 which is vulcanized to the cross member and extends transversely of the truck to a sufficient extent to afford the desired torsional spring action.

The cushion element 33 is enclosed in a tubular section or sleeve 34 to which the cushion element is also vulcanized in order that a torsional relation between the cross member 27 and the tubular section or sleeve 34 may be provided.

The outer end of each tubular section or sleeve 34 is provided with an arm 35 which is rigidly secured thereto, while the free end of the arm has a downwardly disposed face adapted to bear on the journal-box 17 situated at the same end of the truck; the end of the arm being preferably socketed to receive the boss 20 on the journal box and provide a rocking relation therebetween.

In the particular exemplification, the arms 35 are preferably bifurcated as shown in Figure 1, with the bifurcations disposed on opposite sides of the frame and hence in bearing relation with a greater portion of the journal-box 17.

The inner side of the side frame 15 at points intermediate of the planes of the suspension mechanism heretofore described and the bolster 21 is provided with inwardly disposed brackets 36, apertured to receive pins 37 whereby the links 38 are swingingly supported in place; the lower ends of the links 38 being pivotally secured at 39 (see Figure 3) to the bottom of the adjacent ends of the bolster 21 which is thus swingingly suspended from the truck side frames.

In the structure described, the cross member 27 is clamped or secured to the side frame and in order that the cushion suspension means may properly absorb the shocks or movements of the wheels, the rubber elements are placed under torsion which is accomplished by unscrewing nuts 32 sufficiently to permit rotation of the ratchet wheels 30 (which may be accomplished either with a suitable tool or by inserting a short rod or piece of pipe in the holes 31 of the ratchet wheel 30) and hence of the cross members or rods 27 which are rotatably held in the brackets 23 of the side frame. With the tubular rubber elements 33 vulcanized to the cross members 27 and also to the sleeves 34 of the arms 35, it is apparent that the rubber elements 33 will be twisted and the torsion yieldingly transmitted to the tubular or sleeve portions 34 of the bell-crank levers or arms 35 whose free ends will exert downward pressure on the journal-boxes. It is apparent therefore that the vibratory or vertical movements of the truck wheels will be cushioned or absorbed by the rubber elements and the transmission of jolts to the truck frame and to the car body will be prevented.

The cross members 27, as previously stated, may consist of suitable rods capable of withstanding the torsional strains, or these members may consist of telescopically arranged tubes extending from side frame to side frame, with the ends clamped in the sectional hubs 24, 25 and each preferably provided with the annularly arranged teeth 28 and cooperating ratchet wheel 30. Both ends of each cross member 27 are provided with sleeve portions 34 of length commensurate with the predetermined length of the rubber elements 33 capable of providing the degree of torsion.

In practice, the rubber elements 33 are initially placed under torsion sufficient to yieldingly support the side frames 15 with the suspended bolster 21 and superposed car body; but in order to prevent excessive downward movement of the free ends of the bell-crank levers or arms 35, if occasion should require, removal of the truck from beneath the car and hence to prevent the unloaded side frames 15 and bolster 21 swinging too far upwardly, and to regulate the degree of deflection or extent of relative movement between the truck side frame (with the attached or integral pedestals) and the journal-boxes, I provide a rod 41 which extends lengthwise of the truck. The rod 41 is screw-threaded at each end and is of sufficient length to extend beneath and beyond the fulcrum points of the bell-crank levers 35 which are provided with short arms 35ª extending downwardly and have angularly disposed flanges 35ᵇ which are apertured to loosely receive the threaded ends of the rod 41 provided with nuts 42 preferably arranged on opposite sides of the flanges 35ᵇ. The elements just described constitute a stop mechanism for arresting excessive movements, but in order not to interfere with the torsional spring action of the suspension mechanism, the nuts 42 are arranged on the rod 41, at predetermined distances from the flanges of the short arms 35ª of the bell-crank levers 35, as shown in Figure 2.

In Figures 4 and 5 I illustrate a modification in so far as the method of mounting the cross members and the fulcrum points of the supporting arms are concerned; that is to say, instead of the fixed fulcrums of the supporting arms 35 of Figure 1, the supporting arms of the structure shown in Figures 4 and 5 are swingingly mounted. The structure of Figures 4 and 5 shows the side frame 15, at points removed from the pedestal ends, provided with outwardly disposed brackets 43 whose ends are bifurcated and disposed downwardly—namely somewhat of inverted U-shape in cross-section, as shown in Figure 5—to receive the lobes 44 of the hangers 45.

The hangers 45, which are swingingly supported by pins 46, receive the ends of the cross members or rods 27—shown similar to those disclosed in Figure 1, but which may be of the types hereinbefore mentioned—which extend transversely of the truck and are rotatable in the hanger brackets 45.

The outer faces of the hangers 45 are provided with circumferentially arranged teeth 47 adapted to mesh with the teeth of the ratchet wheels 30 which are non-rotatably mounted on the non-circular portions of the studs 29 rigidly secured in the ends of the tubular cross members 27; the outer ends of the studs 29 being threaded and provided with suitable washers and nuts as at 32 whereby the ratchet wheels 30 are firmly held in ratcheting relation with the teeth of the hangers 45.

The cross members 27, inwardly of the hangers 45, have the rubber elements or sleeves 33 vulcanized thereon against independent rotation; these elements or sleeves 33 are enclosed in and vulcanized to the tubular portions or sleeves 48 formed integral with the hubs 49ª of the arms 49; the sleeves 48 being preferably welded, as at 50, to the hubs of the arms and thus provide what may be termed as bell-crank levers. As is apparent, any relative rotative movement between the rods 27 and the bell-crank levers will be torsionally resisted by the rubber sleeves. The outer ends of the arms 49, see Figure 4, extend across the tops of the journal-boxes 17, being preferably provided with downwardly facing surfaces socketed to receive the bosses 20 on the tops of the journal-boxes to permit a rocking relation between the arms or bell-crank levers and the journal-boxes.

Upon loosening the nuts 32, the ratchet wheels 30 and the cross members may be rotated thereby placing the rubber elements under tension which is transmitted through the tubular portions or sleeves 48 to the arms 49; it being understood that the nuts 32 are screwed tightly against the ratchet wheels 30 as soon as sufficient tension has been obtained—this condition being maintained by holding the ratchet wheels aginst movement while screwing the nuts 32 up tightly.

The inner side of the truck side frame member 15, similar to Figure 3, is provided with a bracket 36 to which the upper ends of the links 38 are pivotally secured while the lower ends of the links 38 are pivotally secured at 39 to the bottom of the bolster 21, thereby swingingly suspending the bolster from the truck side frames—it being understood that similar mechanisms are employed on both sides of the truck.

The hubs of the bell-crank levers or arms 49, as in Figure 2, may be provided with the downwardly disposed arms or flanges 35ª apertured to receive the threaded ends of a rod 41 provided with nuts 42, to constitute stop mechanism for arresting excessive vertical movements as previously described.

The exemplifications shown in the drawings are believed to be the best embodiments of the invention, but modifications may be made without, however, departing from the spirit of my invention as defined in the appended claims.

What I claim is:

1. Truck suspension means comprising, in combination with the side frames and the journal-boxes of a car truck, rods disposed transversely of the truck and rotatably supported from the side frames; vertically swinging lever members mounted on the ends of said rods with their other ends bearing on the journal-boxes; shock absorbing rubber elements immovably secured to said rods and to the hubs of said lever members, whereby the latter are maintained in pressure exerting relation with the journal-boxes; and adjustable means operatively intermediate of the ends of said rods and the truck side frames whereby the rods may be rotated, the torsion of the rubber elements regulated and the rotated relation of the rods to the truck side frames maintained.

2. Truck suspension means comprising, in combination with the side frame and the journal-boxes of a car truck, rods disposed transversely of and rotatably secured to the side frame of the truck; vertically oscillatable lever members mounted at one of their ends on said rods, while the other ends bear on the journal-boxes; shock absorbing rubber sleeves intermediate of the rods and the lever members and immovably secured to the rods and to the lever members; regulable means operatively intermediate of the ends of said rods and the side frame whereby the rods may be rotated to provide the desired torsion stress to support the truck.

3. Truck suspension means comprising, in combination with the side frames and the journal-boxes of a car truck, transversely disposed rods rotatably supported at their ends by the side frames; torsion providing means fixedly secured to said rods; lever members fixedly mounted at one of their ends on said torsion providing means while their other ends move vertically into bearing relation with the journal-boxes; means operatively intermediate the ends of said rods and the side frames whereby the rods may be rotated and the torsion of the torsion means controlled; and means for limiting the vertical movement of said lever members.

4. Truck suspension means comprising, in combination with the side frames and the journal-boxes of a car truck, transversely disposed rods rotatably supported from the side frames; rubber sleeves arranged on and immovably secured to said rods; vertically swinging levers with one of their ends arranged in bearing relation with the journal-boxes while the other ends are disposed about said rubber sleeves and immovably secured thereto; ratchet mechanism operatively connected with the ends of said rods and with the truck side frames whereby the rods may be rotated, the torsion of said sleeves regulated and the rotated positions of the rods maintained; and means for limiting the vertical movements of said levers in either direction.

5. Truck suspension means comprising, in combination with the side frames and the journal-boxes of a car truck, transversely disposed rods rotatably supported at their ends by the side frames; rubber sleeves arranged on and immovably secured to said rods; vertically swinging levers provided at one of their ends with elongated hubs disposed about said rubber sleeves and fixedly secured thereto while the other ends are arranged in bearing relation with the journal-boxes; ratchet mechanism operatively associated with the ends of said rods and with the truck side frames whereby the rods may be rotated, the torsion of the rubber sleeves regulated and the rotated positions of the rods maintained; and regulable safety means intermediate the levers on the same side of the truck frame whereby vertical movement of said levers beyond predetermined limits is prevented.

6. Truck suspension means comprising, in combination with the side frames and the journal-boxes of a car truck, the side frames having depending split brackets; transversely disposed rods rotatably supported at their ends in the brackets of the side frames; rubber sleeves disposed lengthwise of the rods and immovably secured to said rods; lever members provided at one of their ends with elongated hubs disposed about the rubber sleeves and vulcanized thereto while the other ends of the levers are arranged in bearing relation with the journal-boxes; ratchet mechanism operatively intermediate the ends of the rods and the side frame brackets whereby the rods may be rotated, the rubber sleeves placed in torsion and the rods maintained in their rotated positions; and regulable means intermediate the hubs of the levers disposed on the same side of the truck whereby the extent of vertical movements of the outer ends of the levers in either direction beyond predetermined limits are controlled.

HENRY E. MUCHNIC.